Figure 1:
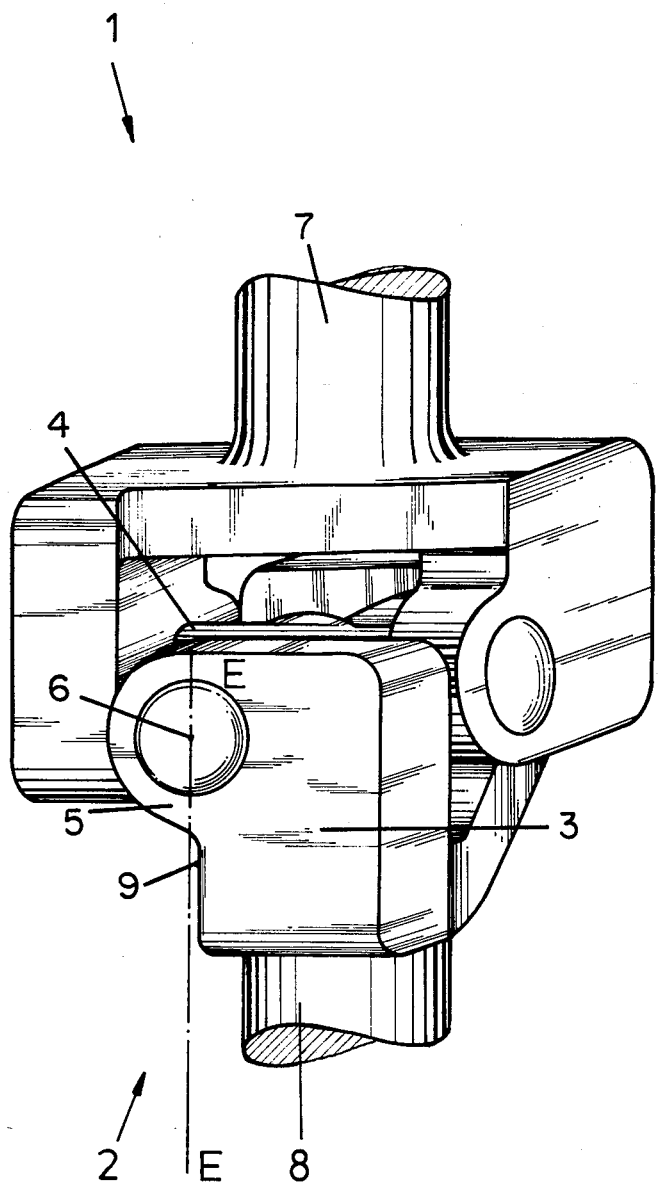

United States Patent

Olschewski et al.

[11] Patent Number: 4,541,818
[45] Date of Patent: Sep. 17, 1985

[54] UNIVERSAL JOINT

[75] Inventors: Armin Olschewski; Zoltan Laszlofalvi; Heinrich Kunkel, all of Schweinfurt, Fed. Rep. of Germany

[73] Assignee: SKF Kugellagerfabriken GmbH, Schweinfurt, Fed. Rep. of Germany

[21] Appl. No.: 610,936

[22] Filed: May 17, 1984

Related U.S. Application Data

[63] Continuation of Ser. No. 348,267, Feb. 12, 1982, abandoned.

[30] Foreign Application Priority Data

Feb. 27, 1981 [DE] Fed. Rep. of Germany ....... 3107373

[51] Int. Cl.[4] .............................................. F16D 3/40
[52] U.S. Cl. ...................................... 464/134; 403/57
[58] Field of Search ................... 403/57, 58; 464/112, 464/134, 135, 136, 905

[56] References Cited

U.S. PATENT DOCUMENTS

| 1,020,476 | 3/1912 | Bocorselski | 464/134 |
| 1,389,422 | 8/1921 | Curtis | 464/136 X |
| 1,700,991 | 2/1929 | Wintercorn | 464/135 X |
| 2,331,982 | 10/1943 | Johnson | 464/134 |
| 2,957,715 | 10/1960 | Berky | 464/112 X |

FOREIGN PATENT DOCUMENTS 517426  7/1957  Italy ................................... 464/136

Primary Examiner—Stuart S. Levy
Assistant Examiner—Daniel P. Stodola
Attorney, Agent, or Firm—Yuter, Rosen & Dainow

[57] ABSTRACT

A universal joint for rotatory drives such as are for example used in motor vehicle construction. To improve the life of the bearings, asymmetrical indentations are provided on the yoke arms, or the yoke arms have tangentially directed sections in which the bearing bores are disposed. As a result, the universal joint is subjected to load, and there is no deformation of the bearing bore or unacceptable cramping of the bearings.

12 Claims, 8 Drawing Figures

UNIVERSAL JOINT

This application is a continuation of application Ser. No. 348,267, filed Feb. 12, 1982, now abandonded.

The invention relates to a Cardan or universal joint, consisting of a spider and a driving yoke and driven yoke mounted on its pivots, the yokes each being provided with two substantially axially disposed arms provided with bearing bores diametrically opposite one another.

Universal joints of this kind are used for rotary drives whenever the driving and driven shafts are at an angle to one another or are subjected to constant angular movements. They are used chiefly in machinery and plant construction and in motor vehicles. In motor vehicles particularly they are often used on the universal shaft for the purpose of compensating for the relative movements between the drive shaft and the engine and between the drive shaft and the chassis. In vehicles having a divided and centrally mounted universal shaft, three universal joints, for example, are used. Furthermore, they are also used for the axle shafts in divided drive shaft vehicles. The bearings of the universal joints can be in the form of rolling contact bearings or sleeve bearings, and they are subject, especially in heavy vehicles with powerful motors, to very heavy alternating loads. The greatest stresses occur, for example, when the gears are changed, in the form of so-called shock loads, or in the case of hard and excessively rapid clutch engagements. For this reason, the drive yokes and driven yokes of universal joints and their arms and bearings must be of very sturdy and especially stable construction. Nevertheless, universal joints designed for extreme peak loads have been unable as yet to achieve acceptance, because the weight and the additional moment of inertia involved in such designs have been found unacceptable for reasons of economy.

The known configurations, therefore, have relatively thin, axially disposed yoke arms, on whose free ends bores are provided for the bearings. Even in the case of particularly rigid materials, the yoke arms flex circumferentially under heavy stress, severe elastic deformation is produced within the material, and the pivot bore becomes greatly distorted from its cylindrical shape. As a consequence the stress on the bearing increases substantially. The unacceptable contact surface pressures thus produced can lead to heavy wear and premature failure of the bearings. It has been found, for example, that needle bearings in such applications last for only 20% of their nominal life because the yoke arms are not sufficiently rigid.

It is therefore the object of the invention to create a universal joint whose weight and size will not be greatly different from those of the joints used formerly, but which will be able to withstand substantially greater stresses and have a longer useful life.

This object is achieved by offsetting the yoke arms from the common plane formed by the center axis of the bearing bore and the axis of rotation of the drive yoke and driven yoke.

The bearing or pivot bores are disposed, in a known manner, diametrically opposite one another and symmetrically about the drive yoke and driven yoke. In accordance with the invention, the sections of the arms joining them to the drive and driven yokes are offset, which offset may, by way of example, be circumferential. As a result of this embodiment, the forces occurring in the case of severe stresses in the direction of the universal joint can indeed flex the yoke arms slightly, but the tensile and compressive stresses thus produced in the yoke arms are unable to substantially affect the shape of the bearing bores. These results achieved with the universal joint in accordance with the invention can, of course, also be used as the basis for reducing the size of all the components if the anticipated stresses are such that great durability is not necessary. The result in that case is an advantageously lower weight and lower cost of manufacture.

According to another embodiment of the invention, each of the yoke arms has, on one side of the common plane, a cutout in the section running from the drive or driven yoke to the bearing bore. In this manner, the tensile or compressive stresses occurring on this side of the yoke arms will be kept largely remote from the bearing bore. If the cut-out extends all the way to the center of the yoke arm, i.e., to a line running through the center of the bearing bore in the direction of the axis of the universal joint, it can be assumed that undesirable distortion of the bearing bore can no longer occur under stress. The reduction of the cross section of the yoke arms in this manner is acceptable in a great number of applications. The cut-out can be in the form of a bore or it can be an indentation created in one edge of the yoke arms.

In another embodiment, each of the yoke arms is made more massive on one side of the common plane. This also results in an unsymmetrical configuration of the yoke arms. Making the arms more massive on one side results in greater stiffness and so when the yoke arms are deflected they have less effect on the shape of the bearing bores. If the cut-outs described in the foregoing example are used, it is possible by making the yoke arms more massive on the other side to provide a cross section that will be heavier than or equal to that of conventional yokes.

According to another embodiment of the invention, each of the yoke arms is configured such that, beginning from its free end containing the bearing bore, it is disposed tangentially and then bends over to the axial direction. This yoke arm has no greater cross section than known configurations, but the bearing bore is disposed at the free end of the tangentially disposed section. In the case of high stresses in the direction of rotation of the universal joint, the yoke arms are able to flex slightly, but the bearing bore is outside of the area of complex compressive and tensile stresses, so that the stressed cylindrical surface of the bearing bore remains unaffected by them. Only uniform tensile or compressive forces occur as in the case of any other loaded bearing. These, however, do not cause any unacceptable distortion and deformation of the bore surface accommodating the load, so that the bearings cannot fail prematurely.

According to another embodiment of the invention, a lateral surface of the yoke arms lies in the plane running through the center axis of the bearing bore and the axis of rotation of the driving or driven yoke. In this construction, the part of the yoke arms that is tangential to the circumferential direction is made of a precise length sufficient to prevent deformation of the bearing bore by the flexing of the yoke arms under load. In this case all advantages of the invention are utilized and a compact configuration is assured.

According to another embodiment of the invention, the section of the yoke arms on the free end, tangential to the circumferential direction, surrounds the bearing bore semicircularly with uniform wall thickness. This assures that, in the case of severe stress in the direction toward the free end of the yoke arms, equal tensions will prevail in the part of the bore that is stressed, thereby promoting a uniform distribution of the load over a great surface area.

In another embodiment of the invention, the wall thickness of the yoke arms in the elbow area i.e., the area of transition from the tangential to the axial section, is more than four times the wall thickness at the free end. The bearing bore thus will be situated well away from the axially disposed portions of the yoke arms, thus making the yoke arms more stable and virtually eliminating distortion under load.

In still another embodiment of the invention, the free end of the section of all yoke arms that is disposed tangentially to the circumferential direction is disposed so as to point in the same circumferential direction around the universal joint. Although the yoke arms can have a large cross section in the elbow area, a very compact, space-saving construction is thus advantageously achieved, inasmuch as the thickened section adjacent the bearing bore of a yoke arm is followed circumferentially by the free end of the next yoke arm. Under load, the thickened, elbow areas of the arms of the driving yoke, for example, are stressed compressively in the circumferential direction, and those of the driven yoke are under tensile stress. In both cases, however, the advantages of the invention are obtained virtually equally, since no deformation of the bearing bores can occur due to flexing of the arms.

In another embodiment of the invention, the free ends of the drive yoke point in one direction of rotation of the universal joint, and those of the driven yoke in the opposite direction of rotation. This arrangement is advantageous when particularly great stresses occur in only one direction of rotation, and the external dimensions of the universal joint are of no great importance.

Figure 2:
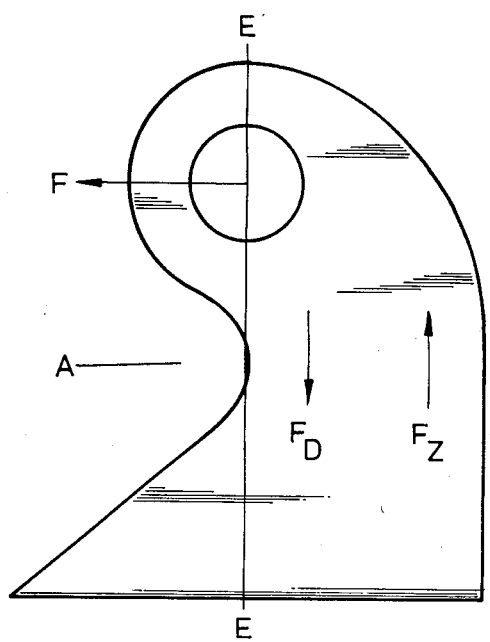

The invention will be described hereinafter in conjunction with the examples represented in the drawing, wherein:

FIG. 1 is a perspective representation of a universal joint having yoke arms all facing in the same circumferential direction around the universal joint, FIG. 2 shows a yoke arm with an open cut-out on one side and reinforcement on the other side.

Figure 3A:
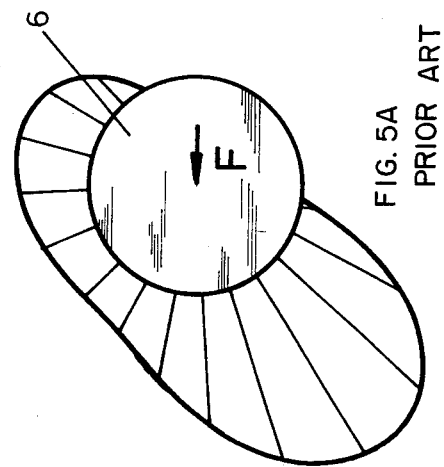
Figure 3B:
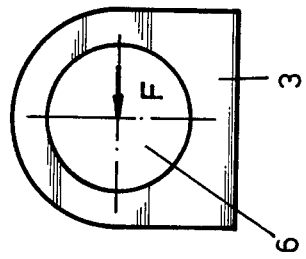
Figure 4A:
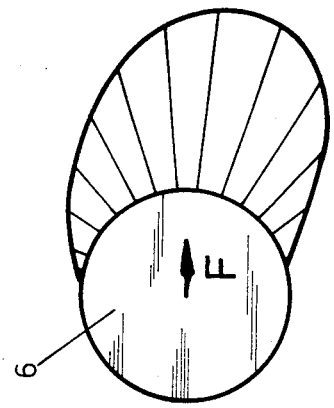
Figure 4B:
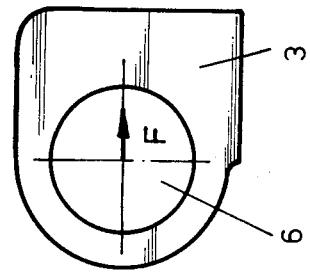

FIG. 3A and 3B are diagrams of the load distribution (FIG. 3A) in the pivot bore in one direction of rotation of the universal joint (FIG. 3B), FIGS. 4A and 4B are diagrams of the load distribution (FIG. 4A) in the pivot bore (FIG. 4B) in a direction of rotation opposite that of FIGS. 3A and 3B, and FIGS. 5A and 5B are diagrams of the load distribution (FIG. 5A) in the pivot bore (FIG. 5B) of a conventional universal joint having axially disposed yoke arms.

The universal joint represented in FIG. 1 consist of a driving yoke 1 and a driven yoke 2 the one being assumed to drive and the other to be driven, merely for ease of comprehension, although their functions can be equally reversed. Both have arms 3 which are pivoted on a spider 4. The arms 3 are provided at their free ends with bearing bores 6 from which they first extend tangentially to the circumferential direction, and they then bend or change direction to an axial orientation, and are thence joined to the drive shaft 7 and driven shaft 8, respectively. In their elbow area on which they bend, the yoke arms are provided with a large cross section.

The free end 5 encompasses the pivot bores 6 with a semicircular portion of equal wall thickness, and projects beyond the axially disposed portion only so far that its side surface 9 is aligned with the central axis of the pivot bores 6. In the case of extreme stresses, the forces in the circumferential direction of the universal joint produce in the pivot bores 6 a slight flexing of the yoke arms 3 within the elastic limit of the material, the yoke arm 3 which is represented at the front in FIG. 1, for example, being flexed leftward and the one opposite it, visible only partially in FIG. 1, being flexed to the right. This flexing produces tensile and compressive stresses in the axially disposed portions of the arms 3, but the pivot bores 6 are virtually unaffected by them, since they are situated outside of the axially disposed section.

The yoke arm represented in FIG. 2 is out of symmetry with the common plane E-E formed by the center axis of the pivot bore and the axis of rotation of the universal joint. It has on one side an indentation A and is strengthened on the other side. In the case of a stress in the direction of rotation of the universal joint, a force F acts on the pivot bore and flexes the yoke arm in its direction, so that compressive stresses $F_D$ and tensile stresses $F_Z$ occur in the material. Their lines of action are situated, however, well outside of the area of the bearing bore that is stressed by the force F, so that no deformation of the bore can occur.

FIG. 3A represents the load distribution in the bearing bore 6 of a yoke arm 3 of FIG. 3B when a force F is applied in the indicated direction by the pivot of the spider, circumferentially of the universal joint, on the cylindrical surface of the bearing bore 6. As the diagram shows, there is a virtually uniform load distribution over 180° of the bore surface, and the pivot bore 6 retains its shape, although due to the extreme stress a slight flexing of the yoke arms 3 takes place.

As it can be seen in FIG. 4A, a force which acts on the yoke arm 3 of FIG. 4B in the reverse direction from that of FIG. 3B produces a load distribution on a rather smaller surface area of the pivot bore 6. What is important, however, in this case, is the virtually equal distribution of force F on both sides of the line action.

Figure 5A:
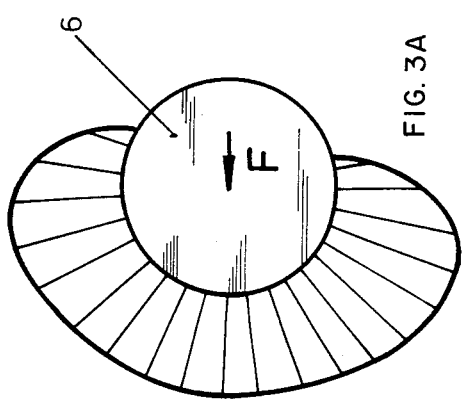
Figure 5B:
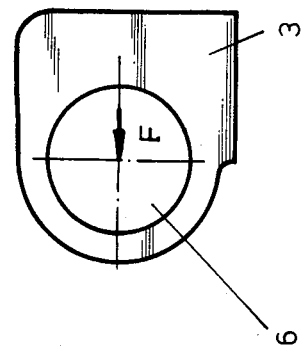

FIG. 5A shows how the force F acting in the circumferential direction is distributed over the area of the bearing bore 6 of a yoke arm 3 of FIG. 5B of conventional construction. The flexing of the yoke arms 3 greatly distorts the bearing bore 6, so that material stresses develop, which, as can be seen in the diagram of FIG. 5A, unequally stress the pivot also outside of the actual direction of the force, i.e., over a range of more than 180°. This causes the pivot to be unacceptably stressed, and it fails.

Other variations and modifications within the scope of the invention will be apparent to those skilled in the art.

What is claimed is:

1. A universal joint comprising a spider, a drive yoke, and a driven yoke, said yokes being pivoted on said spider, each yoke having an axis of rotation, and two arms extending substantially in an axial direction, said arms having diametrically opposite bearing bores with closed cylindrical bore surfaces, the bearing bores of each yoke having an axis, the bearing bore axis of each yoke defining a separate plane with the rotation axis of the drive and driven yokes respectively, each of said yoke arms being joined to the respective yoke and being offset in a circumferential direction with respect to the respective plane formed by the axis of the respective bearing bore and the axis of rotation of the respective yoke, whereby deformation of the bores by stresses in the yoke arms is substantially eliminated.

2. The universal joint as set forth in claim 1, wherein each arm of the drive yoke has an end surface facing in one of the axial directions, and each arm of the driven yoke has an end surface facing in the opposite axial direction.

3. The universal joint of claim 1, wherein along a portion of the length of each of said yoke arms, said length being measured in an axial direction, said yoke arms extend on both sides of said respective plane, whereas along the remaining portion of said lengths, said yoke arms extend on one side of said respective plane only.

4. The universal joint of claim 1, wherein each of the yoke arms extends from the arm portion defining the respective bearing bore in a direction tangential to the circumferential direction of the respective yoke and then extends in an axial direction.

5. The universal joint of claim 3 or 4, wherein a portion of the surface of each of the yoke arms is coplanar with said respective plane.

6. The universal joint of claim 1 or 3, wherein each of the yoke arms has a thickness, as measured from the circumference of the respective bearing bore along a ray extending orthogonally from the axis of said respective bearing bore in a circumferential direction, that is greater on one side of said respective plane than on the other side.

7. The universal joint of claim 6, wherein the portion of each yoke arm that defines the respective bearing bore on one side of the respective plane has a semicircular cross section of uniform thickness as measured from the circumference of said respective bearing bore along a ray extending orthogonally from the axis of symmetry of said respective bearing bore.

8. The universal joint of claim 7, wherein all of said semicircular portions of said yoke arms are disposed such that the respective midpoints of said semicircular portions lie along respective rays extending orthogonally from the axes of symmetry of said respective bearing bores in the same circumferential direction.

9. The universal joint of claim 6, wherein each of the yoke arms has a thickness, as measured from the circumference of the respective bearing bore along a ray extending orthogonally from the center axis of said respective bearing bore, that equals a predetermined amount in a circumferential direction and is greater than four times said predetermined amount in the opposite circumferential direction.

10. A universal joint comprising a spider, drive and driven yokes, and drive and driven shafts respectively connected to said drive and driven yokes, said yokes being pivoted on said spider, said drive and driven shafts respectively defining axes of rotation for said drive and driven yokes, each yoke having two arms extending in the axial direction of the respective drive and driven shaft rotation axes, the arms of each yoke having diametrically opposite bearing bores with closed cylindrical bore surfaces, said opposing bores defining bearing bore axes, the axes of rotation for said drive and driven yokes and the respective bearing bore axes defining drive and driven reference planes, said drive and driven yoke arms being disposed in an offset circumferential direction relative to respective drive and driven reference planes, minimizing tensile and compressive stresses in the bearing bores, whereby deformation of said bearing bores by stresses in the yoke arms are substantially eliminated.

11. A universal joint according to claim 10, wherein said drive and driven yoke arms respectively, for portions of their axial lengths extend on both sides of the respective drive and driven reference planes, extending on one side of said drive and driven reference planes for the remainder of their lengths.

12. A universal joint comprising drive and driven yokes, a spider, and drive and driven shafts, said drive and driven shafts respectively defining axes of rotation for said drive and driven yokes, said drive and driven yokes each including two arms which extend in the axial direction of the respective drive and driven shaft rotation axes, said arms each having free ends and integral axial portions, said free ends having diametrically opposing bearing bores with closed bore surfaces for pivoted connection of the yoke arms on the spider, said drive and driven axial arm portions respectively connecting the drive and driven yokes to the drive and driven shafts, said axial arm portions of each yoke being offset from the respective free ends, minimizing tensile and compressive stresses in the bearing bores, whereby deformation of said bearing bores by stresses in the yoke arms are substantially eliminated.

* * * * *